(12) United States Patent
Adams

(10) Patent No.: US 7,506,601 B2
(45) Date of Patent: Mar. 24, 2009

(54) BOAT FENDER MOUNT

(76) Inventor: Glenn A. Adams, 5059 Dixie Garden Dr., Shreveport, LA (US) 71105

( * ) Notice: Subject to any disclaimer, the term of this patent is extended or adjusted under 35 U.S.C. 154(b) by 0 days.

(21) Appl. No.: 11/821,023

(22) Filed: Jun. 21, 2007

(65) Prior Publication Data

US 2008/0000409 A1    Jan. 3, 2008

Related U.S. Application Data

(60) Provisional application No. 60/817,475, filed on Jun. 30, 2006.

(51) Int. Cl.
*B63B 59/02* (2006.01)
(52) U.S. Cl. ........................ 114/219; 405/212
(58) Field of Classification Search ............... 114/219; 405/212–215; 248/534, 535, 539, 541; D12/168
See application file for complete search history.

(56) References Cited

U.S. PATENT DOCUMENTS

| | | | |
|---|---|---|---|
| 3,197,189 A | 7/1965 | Pemper et al. ............... 267/1 |
| 3,449,917 A | 6/1969 | Roskopf ...................... 61/48 |
| 5,628,270 A | 5/1997 | Ryll et al. ................... 114/219 |
| 5,740,752 A | 4/1998 | Allenbaugh ................. 114/230 |
| 5,762,016 A * | 6/1998 | Parsons ....................... 114/219 |
| 6,327,989 B1 | 12/2001 | Beach .......................... 114/219 |
| 6,349,661 B1 | 2/2002 | Dusek .......................... 114/219 |
| 6,406,221 B1 | 6/2002 | Collier ......................... 405/213 |
| 6,513,449 B1 | 2/2003 | Stewart et al. ............... 114/219 |
| 6,823,811 B1 | 11/2004 | Drake .......................... 114/219 |

* cited by examiner

*Primary Examiner*—Ed Swinehart
(74) *Attorney, Agent, or Firm*—John M. Harrison

(57) ABSTRACT

A boat fender mount which is characterized by a fender mount plate of selected shape and size adapted for receiving a boat fender and a selected number (typically two) of piling plates typically fixed or hingedly attached to the fender mount plate in spaced-apart relationship with respect to each other and having aligned, adjustable piling openings or recesses for securing the fender mount plate and the attached boat fender to a piling. In one embodiment the boat fender is secured to the fender mount plate by mount straps or ties which extend from the boat fender through openings provided in the fender mount plate. In another embodiment the fender mount plate is oval or elliptically-shaped and is capable of receiving the boat fender along the long or short axis, vertically or horizontally, with the boat fender in position over a water body to provide cushioning for boats moored adjacent to the piling. The fender mount plate can also typically be square or rectangular and regardless of shape, may be fitted with slots for receiving belts that extend around the piling to secure the boat fender mount on the piling. The piling plate or plates may each be fitted with hinges and vertically registering openings, as well as a sliding clamp at the respective oversized or elongated openings for receiving the piling and securing the piling plates and boat fender mount on pilings of varying size.

15 Claims, 4 Drawing Sheets

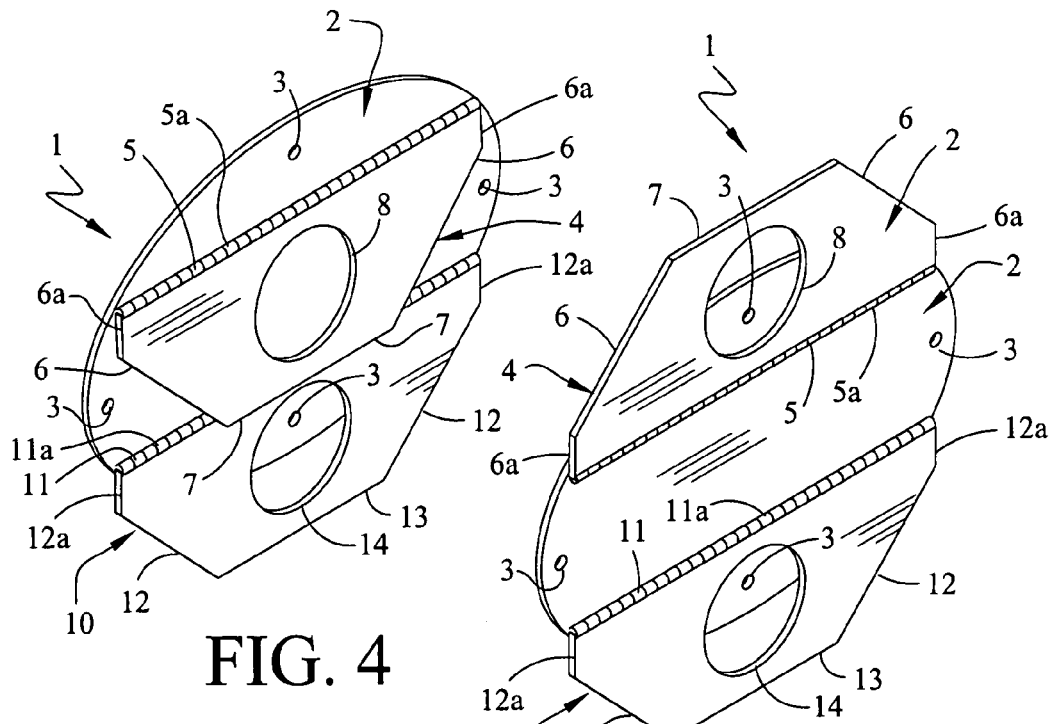
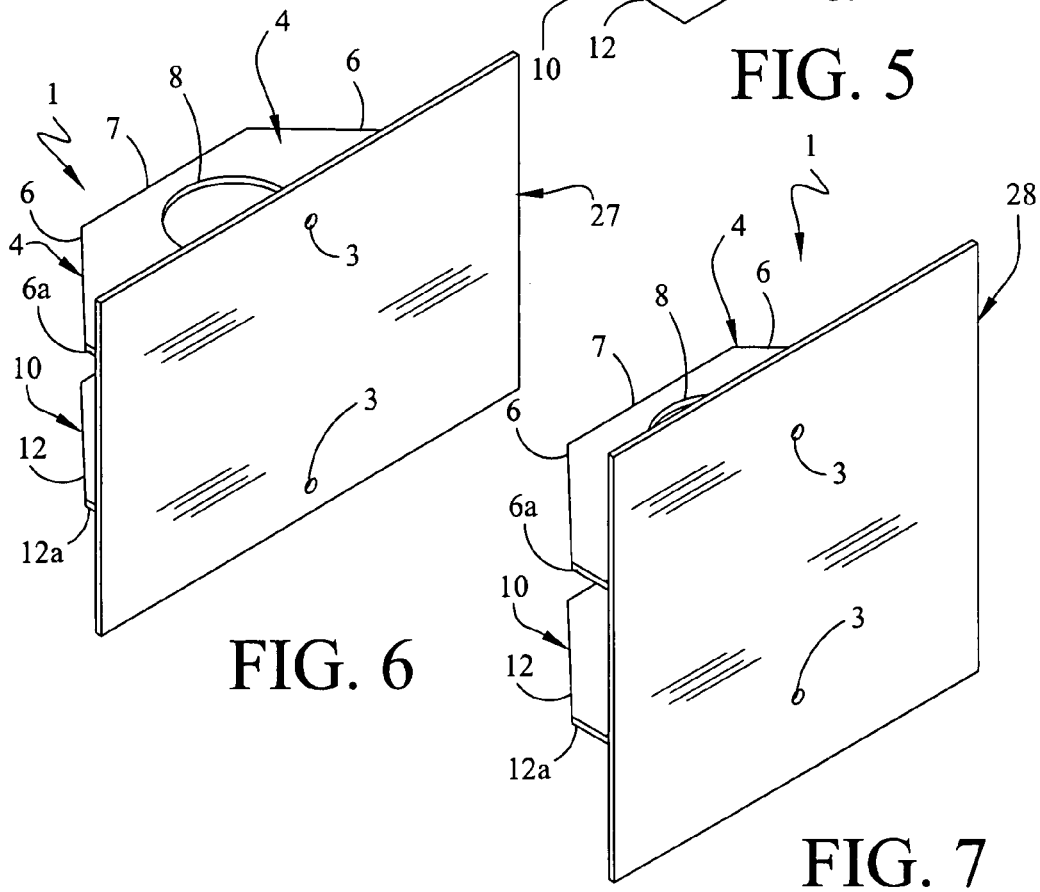

BOAT FENDER MOUNT

CROSS-REFERENCE TO RELATED APPLICATIONS

This application claims the benefit of and incorporates by reference in its entirety prior filed copending U.S. Provisional Application Ser. No. 60/817,475, filed Jun. 30, 2006.

SUMMARY OF THE INVENTION

This invention relates to boat and watercraft fenders or arresters and more particularly, to a boat fender mount which is characterized by a typically flat fender mount plate of selected shape and size for receiving a boat fender in either the horizontal or vertical configuration and positioning the boat fender over a water body. In a typical embodiment the boat fender is secured to the fender mount plate by mount straps or ties extending from the boat fender through openings provided in the fender mount plate. The fender mount plate is secured to a piling on a dock or wharf on a water body using one or more, and typically two, parallel top and bottom piling plates, which may be adjustable or fixed with respect to the fender mount plate but are typically hinged to the fender mount plate in spaced-apart relationship with respect to each other. In one embodiment both the top and bottom piling plates include an opening for fitting the piling plates over the piling to locate the fender mount plate and the corresponding boat fender attached to the fender mount plate in a desired vertical or horizontal position above the water. In another embodiment the piling plates are recessed, shaped or contoured to fit against the piling and the boat fender mount is secured in place using one or more belts or straps that typically extend through spaced-apart slots in the fender mount plate and around the piling. In yet another embodiment of the invention a sliding clamp is fitted to each of the piling plates to engage the piling and adjust the size of each corresponding oversized or elongated piling opening therein. In a further embodiment the fender mount plate is elliptical and one or more boat fenders may be mounted on the fender mount plate in either the vertical or horizontal configuration, wherein the boat fender is selectively aligned with the long or short axis of the elliptically-shaped fender mount plate. Alternatively, the fender mount plate may be square or rectangular or have any selected configuration, including a polygon, in non-exclusive particular, according to the desires of the user. In each case, the fender mount plate and parallel top and bottom piling plates are so positioned on the piling using one of the techniques described above, as to place the boat fender(s) in position to arrest and cushion the hull of a watercraft moored on the water body adjacent to the piling. In the hinged piling plate embodiment of the invention each of the top and bottom piling plates are hinged to the fender mount plate in spaced-apart, typically parallel relationship with respect to each other, such that the boat fender mount can be folded and packaged for shipment or deployed for storage in a minimum of space.

BRIEF DESCRIPTION OF THE DRAWINGS

The invention will be better understood by reference to the accompanying drawings, wherein:

FIG. 4 is a rear perspective view of the boat fender mount illustrated in FIGS. 1-3, removed from the piling and positioned with the top and bottom piling plates in a first folded configuration against the elliptical fender mount plate;

FIG. 5 is a rear perspective view of the boat fender mount illustrated in FIG. 4, more particularly illustrating the top piling plate hingedly folded upwardly and the bottom piling plate downwardly, with respect to the fender mount plate, in a folded configuration;

FIG. 6 is a front perspective view of an alternative embodiment of the boat fender mount, wherein the fender mount plate is shaped in the configuration of a rectangle;

FIG. 7 is another embodiment of the boat fender mount of this invention, wherein the fender mount plate is shaped in the configuration of a square;

DESCRIPTION OF THE PREFERRED EMBODIMENTS

Figure 1:
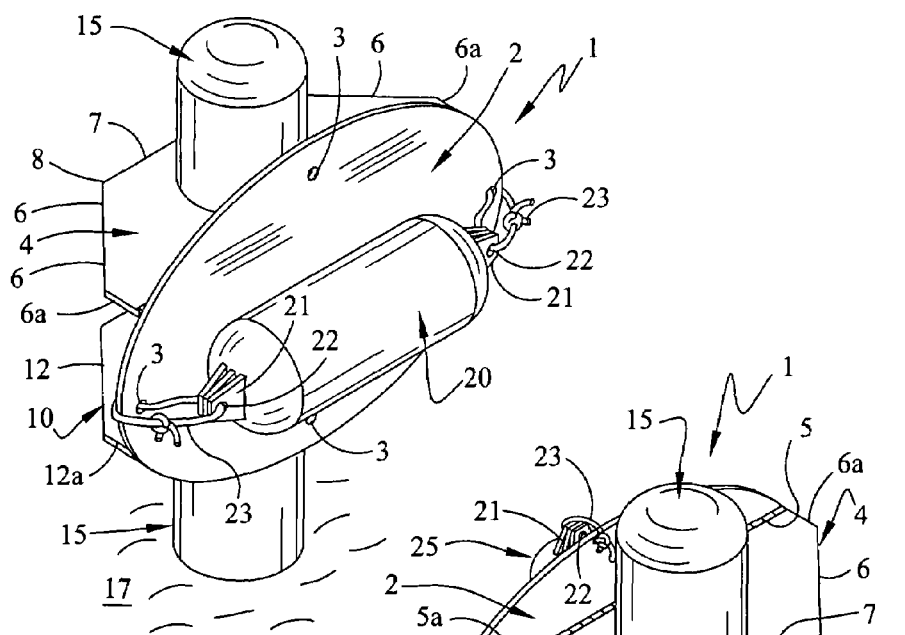
FIG. 1 is a front perspective view of a typical embodiment of the boat fender mount of this invention utilizing an elliptical fender mount plate, a pair of hinged piling plates and a horizontally-mounted boat fender attached to the fender mount plate.
Figure 2:
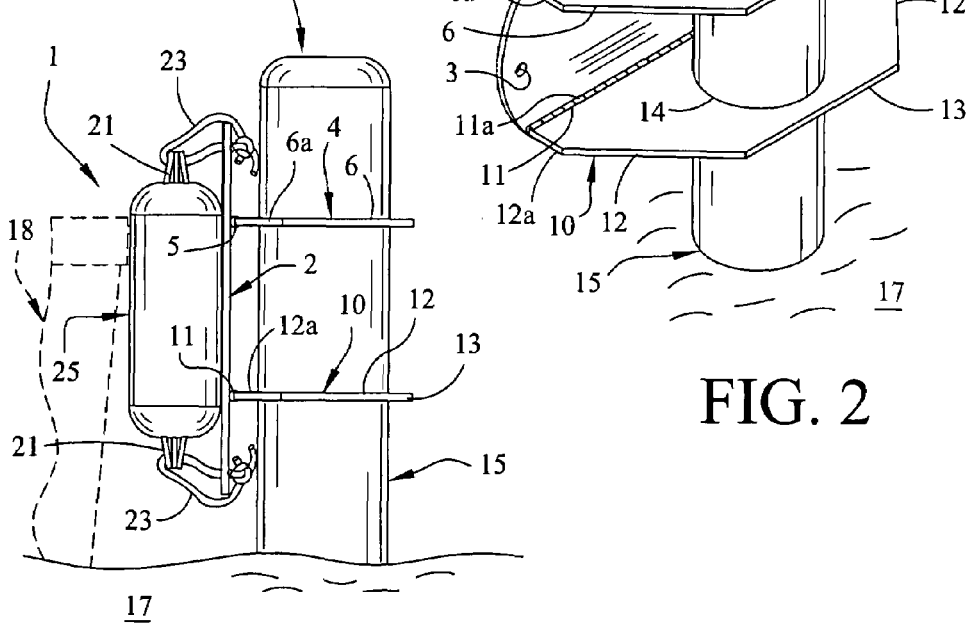
FIG. 2 is a rear perspective view of the boat fender mount illustrated in FIG. 1, with the boat fender vertically mounted on the fender mount plate.
Figure 3:
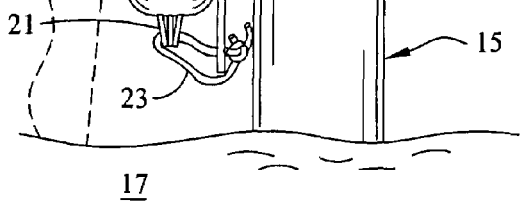
FIG. 3 is a side view of the boat fender mount illustrated in FIG. 2.
Figures 11, 12, 13:
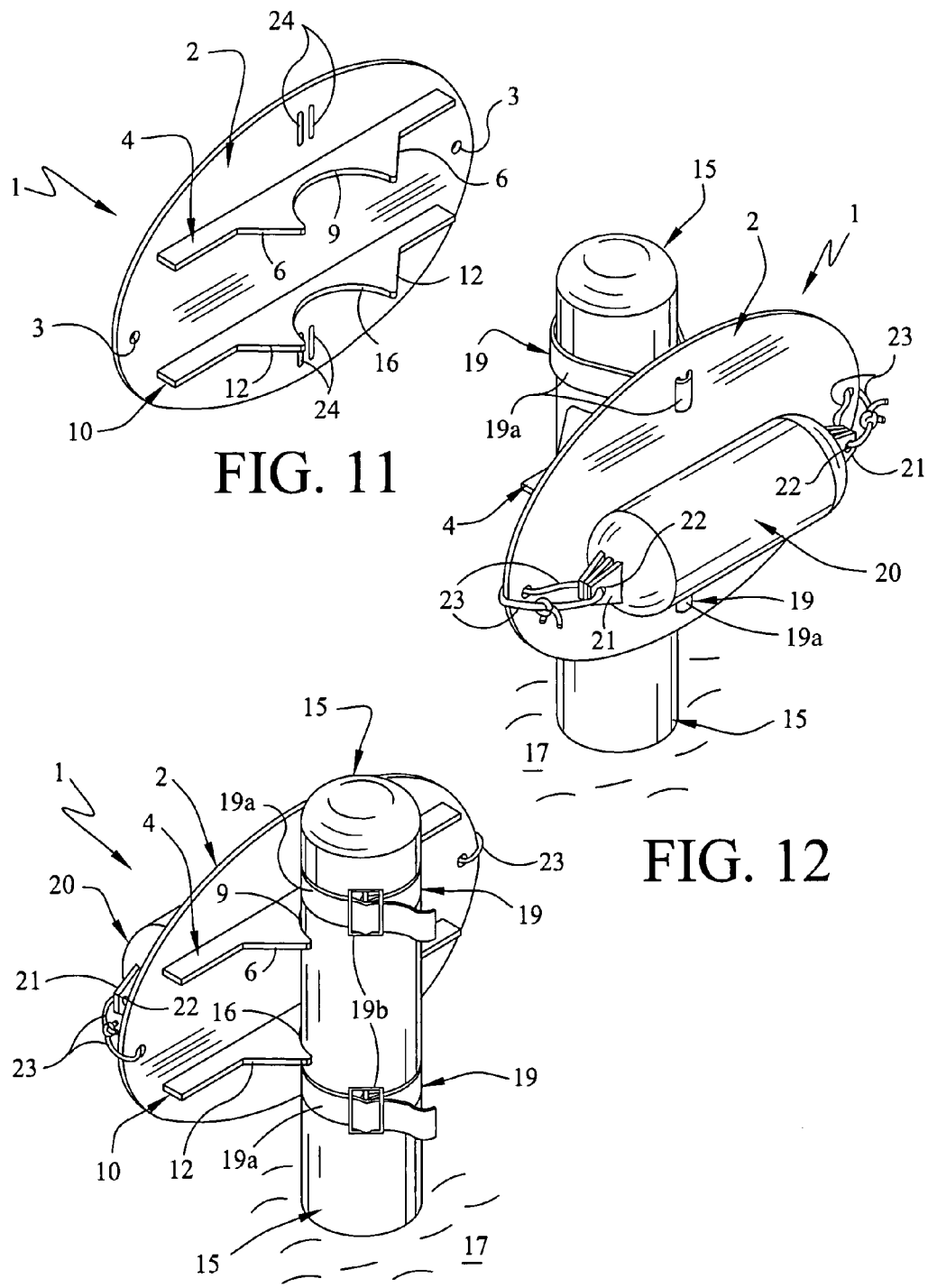
FIG. 11 is a rear perspective view of still another embodiment of the boat fender mount, wherein the top and bottom piling plates are rigidly attached to the fender mount plate and are recessed, shaped or contoured to rest against a piling.
FIG. 12 is a front perspective view of the boat fender mount illustrated in FIG. 11, illustrating the boat fender mount secured to a piling using a pair of belts or straps and cooperating buckles.
FIG. 13 is a rear perspective view of the piling-mounted boat fender mount illustrated in FIG. 12.

Referring initially to FIGS. 1-5 of the drawings, in a first embodiment the boat fender mount of this invention is illustrated by reference numeral 1. The boat fender mount 1 is characterized in this embodiment by an elliptical fender mount plate 2, having a top piling plate 4 and a bottom piling plate 10 attached to one side thereof for mounting purposes. The top piling plate 4 is secured to the elliptical fender mount plate 2 by a top plate hinge 5 at a top plate hinge edge 5a, while the bottom piling plate 10 is attached to the elliptical fender mount plate 2 in spaced-apart relationship with respect to the top piling plate 4 by a bottom plate hinge 11 at a bottom plate hinge edge 11a. However, it will be appreciated by those skilled in the art that both the top piling plate 4 and the bottom piling plate 10 can be fixed to the elliptical fender mount plate 2 in any convenient manner, without using the hinges, preferably in a perpendicular relationship with respect to the fender mount plate 2, as illustrated in FIGS. 11-13. As further illustrated in FIGS. 1-5, the top piling plate 4 is typically characterized by opposite top plate bevels 6, each forwardly-extending from a rear edge 7 to parallel top plate sides 6a, that extend to and terminate at the top plate hinge edge 5a, where the top plate hinge 5 is secured. The bottom piling plate 10 is similarly preferably provided with bottom plate bevels 12, each extending from a bottom plate rear edge 13 to parallel bottom plate sides 12a, that terminate at the bottom plate hinge edge 11a, which receives the bottom plate hinge 11. The top piling plate 4 and bottom piling plate 10 illustrated in FIGS. 1-5 are also provided with a top plate opening 8 and a bottom plate opening 14, each sized for fitting on a piling 15 (FIGS. 1-3).

Figure 8:
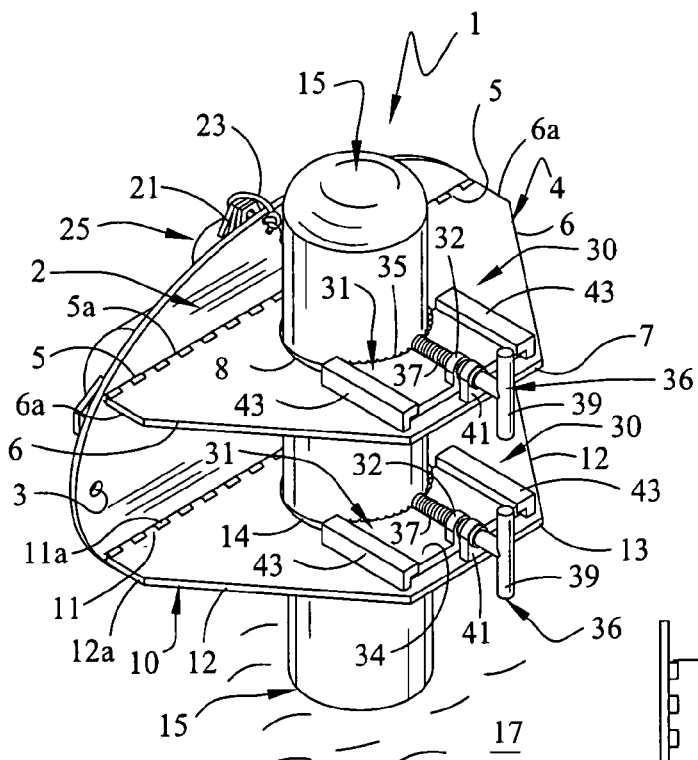
FIG. 8 is another typical embodiment of the boat fender mount, including an adjustable clamp attached to each of the piling plates for mounting the boat fender mount on pilings of various size.
Figure 9:
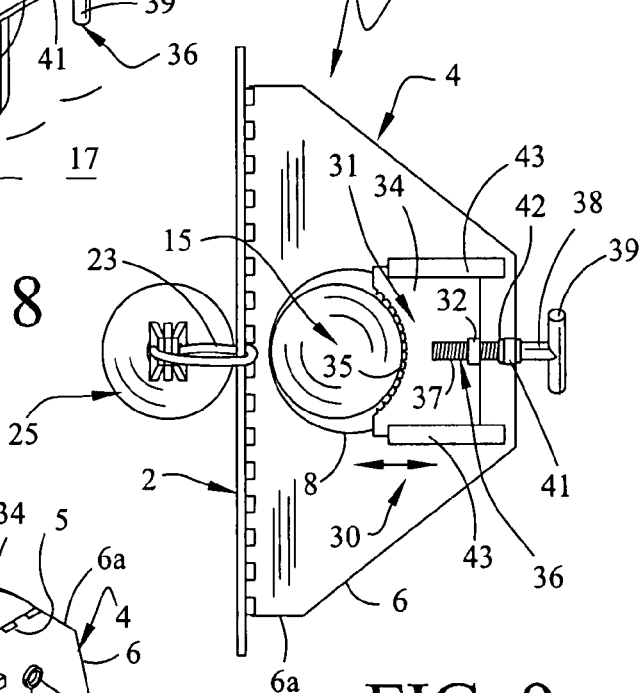
FIG. 9 is a top view of the boat fender mount illustrated in FIG. 8.
Figure 10:
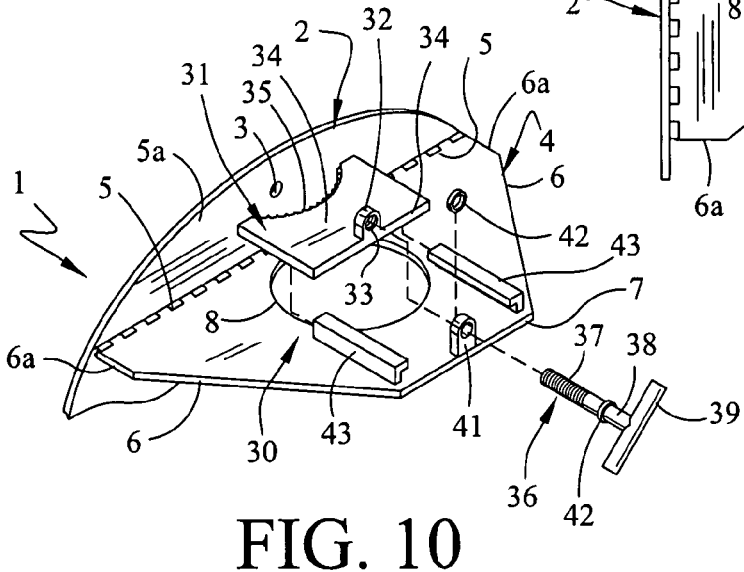
FIG. 10 is an exploded view, partially in section, of a top adjustable clamp in the boat fender mount illustrated in FIGS. 8 and 9.

Alternatively, and in another embodiment of the invention, a pair of piling plate clamps 30 are provided on the top piling plate 4 and bottom piling plate 10, as further illustrated in FIGS. 8-10 of the drawings. The top plate opening 8 and bottom plate opening 14 in this embodiment are each oversized or elongated with respect to a piling 15 and by operation of the piling plate clamps 30, are vertically aligned with each other when the top piling plate 4 and the bottom piling plate 10 are hingedly extended into substantial perpendicular relationship from the elliptical fender mount plate 2, as illustrated. Accordingly, the boat fender mount 1 can be fitted over any vertical or nearly vertical piling 15 by adjusting the piling plate clamps 30 on the top piling plate 4 and the bottom piling plate 10, aligning the respective top plate opening 8 and bottom plate opening 14 with the piling 15, fitting the top piling plate 4 and the bottom piling plate 10 over the piling 15 into a desired position and tightening the piling plate clamps 30, respectively, against the piling 15, as further illustrated in FIGS. 8-10 of the drawings.

Referring again to FIGS. 8-10 of the drawings, in a typical embodiment each filing plate clamp 30 includes an adjusting plate or arm 31 which is slidably disposed on the top piling plate 4 and bottom piling plate 10, respectively, in a pair of spaced-apart, parallel guide rails 43, mounted on the top piling plate 4 and bottom piling plate 10, respectively. Each adjusting arm 31 is typically characterized by a curved plate face fitted with an array of plate teeth 35 (FIG. 10) for engaging the piling on the opposite side of the respective top piling plate 4 at the top plate opening 8 and the bottom piling plate 10 at the bottom plate openings 14, respectively, as illustrated. An adjusting arm bracket 32 is fitted to the adjusting arm 31 and includes a threaded opening 33 for threadably receiving an adjusting rod 36, having rod threads 37 that extend to a rod shank 38, fitted with a handle 39. The rod shank 38 of the adjusting rod 36 extends through a bearing or bushing 42, mounted in a bearing bracket 41 which is mounted on the top piling plate 4 and the bottom piling plate 10, respectively, as further illustrated in FIG. 10. Accordingly, it will be appreciated by those skilled in the art that rotation of the handle 39 and the adjusting rod 36 in the clockwise direction as viewed in FIG. 8 causes the adjusting arm bracket 32 and the connected arm plate 34 of the adjusting arm 31 to traverse the top piling plate 4 and the bottom piling plate 10 between the corresponding guide rails 43, respectively, as further illustrated in FIGS. 8 and 9. This action facilitates tightly clamping each of the top piling plate 4 and the bottom piling plate 10 on the piling 15, as the respective plate teeth 35 engage the piling 15 at the top plate opening 8 and bottom plate opening 14, respectively, to secure the top piling plate 4, the bottom piling plate 10 and the boat fender mount 1 tightly on the piling 15. Release of the boat fender mount 1 from the piling 15 is effected by reverse-rotating the handle 39 to retract the adjusting arm 31 and the plate teeth 35 fitted on the arm plate 34 away from the piling 15 in each of the top piling plate 4 and the bottom piling plate 10, to facilitate lifting the boat fender mount 1 from the piling 15.

Referring again to FIG. 1 of the drawings, a typically conventional horizontal boat fender 20 is illustrated and is positioned in horizontal configuration on the elliptical fender mount plate 2, such that the horizontal boat fender 20 extends along the major axis of the elliptical fender mount plate 2. The horizontal boat fender 20 typically includes boat fender tie mounts 21, fitted with mount openings 22 for receiving boat fender straps or ties 23 at each end. The boat fender straps or ties 23 are typically extended through corresponding mount plate openings 3 provided in the fender mount plate 2 and tied in place, to secure the horizontal boat fender 20 on the elliptical fender mount plate 2 in the configuration illustrated in FIG. 1. Alternatively, a vertical boat fender 25 can be similarly attached to the elliptical fender mount panel 2 as illustrated in FIGS. 2 and 3 of the drawings, wherein the vertical boat fender 25 extends vertically across the minor axis of the elliptical fender plate 2 and is tied in place using the boat fender straps or ties 23 that extend through mount openings 22 provided in the boat fender tie mounts 21, respectively, and through the corresponding mount plate openings 3 provided in the elliptical fender mount plate 2. It will be further appreciated by those skilled in the art that the horizontal boat fender 20 and vertical boat fender 25 can be one and the same in design and simply positioned to the horizontal or vertical configuration as illustrated in FIGS. 1-3 and heretofore described. Alternative boat fender numbers, shapes and sizes can be used, depending upon the size of the boat fender mount 1 and the size and weight of the watercraft to be moored. Furthermore, the horizontal boat fender 20 and vertical boat fender 25 are typically constructed according to conventional boat fender standards for arresting, cushioning and protecting yachts, fishing vessels and commercial and recreational boats and watercraft of all sizes and tonnage.

Referring now to FIG. 6 of the drawings, in an alternative embodiment of the invention the boat fender mount 1 is characterized by a rectangular fender mount plate 27 which is fitted with a top piling plate 4 and bottom piling plate 10, typically in the same manner as the elliptical fender mount plate 2 illustrated in FIGS. 1-5 of the drawings. Accordingly, one or more conventional horizontal boat fenders 20 or vertical boat fenders 25 (not illustrated) can be attached to the rectangular fender plate 27 using the corresponding boat fender straps or ties 23 and mount plate openings 3, as illustrated in FIGS. 1-3 of the drawings and heretofore described.

In similar manner, a square fender mount plate 28 can be provided in the boat fender mount 1 as illustrated in FIG. 7 and receives a top piling plate 4 and a bottom piling plate 10, as described above with respect to the boat fender mount 1 illustrated in FIGS. 1-5 of the drawings. One or more of the horizontal boat fender 20 or vertical boat fender 25 can be likewise attached to the square fender mount plate 28 in the horizontal or vertical configuration, as desired, using the boat fender straps or ties 23 and the mount plate openings 3 provided in the square fender mount plate 28, as heretofore described and illustrated.

It will be further appreciated by those skilled in the art that in the embodiment of the invention illustrated in FIGS. 1-5 of the drawings, the boat fender mount 1 of this invention is designed for folding flat in the alternative configurations illustrated in FIGS. 4 and 5, by folding the top piling plate 4 and the bottom piling plate 10 against the elliptical fender mount plate 2 by operation of the top plate hinge 5 and the bottom plate hinge 11, respectively. The boat fender mount 1 illustrated with the piling plate clamps 30 in FIGS. 8-10 can be similarly folded. In this manner, after removal of the boat fender or fenders by utilizing the respective boat fender straps or ties 23, the boat fender mount 1 can be transported or stored in a relatively flat configuration and in a minimum of space.

Still further in the alternative, as illustrated in FIGS. 11-13, it will be appreciated that the top piling plate 4 and the bottom piling plate 10 can be fixed to the elliptical fender plate 2, the rectangular fender mount plate 27 or the square fender mount plate 28 in any convenient manner, as illustrated in FIGS. 1-3, respectively, without use of the top plate hinge 5 or the bottom plate hinge 11, as desired. In this embodiment the top piling plate 4 and the bottom piling plate 10 are each provided with a curved top plate recess 9 and bottom plate recess 16, respectively, typically defined by top plate bevels 6 and bottom plate bevels 12, respectively, which recesses accommodate and tighten on the piling 15 by means of a pair of spaced-apart mount belts 19, to locate the boat fender mount in a watercraft-arresting and cushioning position over the water 17. Each mount belt 19 typically includes a belt strap 19a that fits through a corresponding set of belt slots 24, spaced-apart in the elliptical fender mount plate 2, as illustrated in FIG. 11. A belt buckle 19b typically secures each mount belt 19 and the boat fender mount 1 on the piling 15. The elliptical fender mount plate 2 is thus positioned to receive and removably mount one or more corresponding horizontal boat fenders 20 (FIG. 12 or 13) or vertical boat fenders 25 (FIGS. 2 and 3) as described above.

It will also be appreciated by those skilled in the art that the components of the boat fender mount 1 of this invention can be constructed of a variety of materials, depending upon the desired application. For example, under circumstances where the watercraft to be moored are relatively small, certain lightweight plastics can be used. Where heavier boats are to be moored, heavier plastic, wood, such as plywood, or metal such as stainless steel or aluminum components can be used to fabricate the folding boat fender mount 1. Furthermore, a single piling plate or multiple numbers of piling plates can be used in the invention instead of the two piling plates illustrated in the drawings, as desired.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A boat fender mount for mounting on a piling, comprising a boat fender mount plate for receiving a boat fender; a pair of piling plates extending from said boat fender mount plate in spaced-apart relationship with respect to each other; mount openings provided in said boat fender mount plate; at least one strap or tie for extending through said mount openings and engaging said boat fender mount plate and the piling; and an arcuate opening provided in each of said piling plates for accommodating the piling and securing said piling plates, said boat fender mount plate and the boat fender on the piling responsive to tightening of said strap or tie.

2. A boat fender mount for mounting on a piling comprising a boat fender mount plate for receiving a boat fender; at least one piling plate extending from said boat fender mount plate; a plate opening provided in said piling plate for accommodating the piling; hinges provided on said piling plate and said boat fender mount plate for hingedly connecting said piling plate to said boat fender mount plate and folding said piling plate against said boat fender mount plate when said boat fender mount is not mounted on the piling.

3. The boat fender mount of claim 2 comprising at least one strap or tie for engaging the boat fender mount plate and at least one mount opening provided in said boat fender mount plate for receiving said strap or tie and securing the boat fender mount on the piling.

4. The boat fender mount of claim 2 comprising an adjusting mechanism provided on said piling plate at said plate opening for engaging the piling and adjustably securing said boat fender mount on the piling.

5. The boat fender mount of claim 2 wherein said at least one piling plate comprises at least two piling plates extending from said boat fender mount plate in spaced-apart relationship with respect to each other.

6. The boat fender mount of claim 5 wherein said boat fender mount plate is shaped substantially in the configuration of an ellipse.

7. The boat fender mount of claim 6 comprising ties for engaging the boat fender mount plate and mount openings provided in said boat fender mount plate for receiving said ties and securing said boat fender mount plate on the piling.

8. A folding boat fender mount for mounting on a piling over a water body, comprising a boat fender mount plate for receiving a boat fender; at least two piling plates carried by said boat fender mount plate in spaced-apart relationship with respect to each other; plate openings provided in said piling plates in substantially registering relationship with respect to each other; and piling plate clamps slidably engaging said piling plates at said plate openings, respectively, wherein said piling plates are hingedly extended from said boat fender mount plate and fitted over the piling at said plate openings for mounting said folding boat fender mount on the piling responsive to tightening of said piling plate clamps against the piling.

9. The folding boat fender mount of claim 8 comprising ties provided on the boat fender and mount openings provided in said boat fender mount plate for receiving said ties and securing the boat fender on said boat fender mount plate.

10. The folding boat fender mount of claim 8 comprising hinges provided on said piling plates for hingedly connecting said piling plates to said boat fender mount plate in spaced-apart relationship with respect to each other and folding said piling plates against said boat fender mount plate when said boat fender mount is not mounted on the piling.

11. The folding boat fender mount of claim 10 comprising ties provided on the boat fender and mount openings provided in said boat fender mount plate for receiving said ties and securing the boat fender on said boat fender mount plate.

12. A boat fender mount for removably mounting on a piling over a water body, comprising a boat fender mount plate for receiving a boat fender having mount devices for securing the boat fender on said boat fender mount plate; a first piling mount plate attached to said boat fender mount plate; a second piling mount plate attached to said boat fender mount plate in spaced-apart, substantially parallel relationship with respect to said first piling mount plate; a first plate recess provided in said first piling mount plate and a second plate recess provided in said second piling mount plate, said first plate recess and said second plate recess substantially aligned for engaging the piling; first and second sets of plate openings provided in said boat fender mount plate in spaced-apart relationship with respect to each other; a first belt extending through said first of said sets of plate openings and around the piling; and a second belt extending through said second of said sets of plate opening and around the piling, for securing said boat fender mount on the piling responsive to positioning the boat fender outwardly of the piling and tightening said first belt and said second belt against the piling.

13. The folding boat fender mount of claim 12 comprising mount receptacles provided in said boat fender mount plate for receiving the mount devices of the boat fender and securing the boat fender to said boat fender mount plate.

14. The folding boat fender mount of claim 13 wherein said mount receptacles comprise mount opening provided in said boat fender mount plate and the mount devices provided on the boat fender are ties or straps for insertion through said mount openings.

15. The folding boat fender mount of claim 14 wherein said boat fender mount plate is shaped substantially in the configuration of an ellipse.

* * * * *